US011869311B2

(12) United States Patent
Hall et al.

(10) Patent No.: US 11,869,311 B2
(45) Date of Patent: Jan. 9, 2024

(54) GAMING MACHINE WITH MODIFIED PRIZE FEATURE

(71) Applicant: Aristocrat Technologies Australia Pty Limited, North Ryde (AU)

(72) Inventors: Naomi Hall, Lane Cove (AU); Scott Olive, Lane Cove (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 74 days.

(21) Appl. No.: 15/289,700

(22) Filed: Oct. 10, 2016

(65) Prior Publication Data

US 2017/0098347 A1 Apr. 6, 2017

Related U.S. Application Data

(63) Continuation of application No. 13/617,518, filed on Sep. 14, 2012, now Pat. No. 9,472,056, which is a (Continued)

(30) Foreign Application Priority Data

Jan. 21, 2005 (AU) ................................ 2005900256

(51) Int. Cl.
*G07F 17/32* (2006.01)

(52) U.S. Cl.
CPC .......... *G07F 17/3267* (2013.01); *G07F 17/32* (2013.01); *G07F 17/3244* (2013.01); *G07F 17/3262* (2013.01)

(58) Field of Classification Search
CPC .. G07F 17/32; G07F 17/3244; G07F 17/3262; G07F 17/3267
(Continued)

(56) References Cited

U.S. PATENT DOCUMENTS 5,275,400 A * 1/1994 Weingardt .............. A63F 3/081 273/143 R
5,542,669 A 8/1996 Charron et al.
(Continued)

FOREIGN PATENT DOCUMENTS

| | | |
|---|---|---|
| NZ | 510850 | 9/2003 |
| NZ | 523972 | 8/2004 |
| WO | 01/74465 | 10/2001 |

OTHER PUBLICATIONS

New Zealand Examination Report in Application No. NZ544852, dated Jan. 31, 2006.
(Continued)

*Primary Examiner* — Omkar A Deodhar
(74) *Attorney, Agent, or Firm* — McAndrews, Held & Malloy, Ltd.

(57) ABSTRACT

A gaming system is provided having a display and a game controller. The system implements a game wherein random events are caused to be displayed on the display and, if a predefined winning event results, the system awards a prize. A feature game of the gaming system includes a series of prize outcomes and a series of intervening games, which provide a player with a chance of advancing to a subsequent prize outcome in the event of a winning outcome in an intervening game. A monitoring means may be provided for monitoring and indicating the number of non-winning game outcomes and triggering a penalty event in the event of the non-winning outcomes exceeding a threshold number. In another aspect, a prize outcome of a feature is a progressive prize and a progressive prize modifier for modifying the progressive prize before awarding the prize.

20 Claims, 12 Drawing Sheets

Related U.S. Application Data continuation of application No. 11/338,045, filed on Jan. 23, 2006, now Pat. No. 8,287,367.

(58) Field of Classification Search
USPC .............................................. 463/16, 20, 29
See application file for complete search history.

(56) References Cited

U.S. PATENT DOCUMENTS

| | | | |
|---|---|---|---|
| 6,102,798 | A | 8/2000 | Bennett |
| 6,322,451 | B1 | 11/2001 | Miura |
| 6,634,946 | B1 | 10/2003 | Bridgeman et al. |
| 6,663,487 | B1 | 12/2003 | Ladner |
| 7,011,581 | B2 | 3/2006 | Cole et al. |
| 7,331,863 | B2 | 2/2008 | Baerlocher |
| 2001/0004607 | A1 | 6/2001 | Olsen |
| 2002/0107066 | A1 | 8/2002 | Seelig et al. |
| 2003/0054875 | A1 * | 3/2003 | Marks ................. G07F 17/3244 463/20 |
| 2003/0157978 | A1 | 8/2003 | Englman |
| 2003/0216165 | A1 * | 11/2003 | Singer ................. G07F 17/3211 463/20 |
| 2003/0236116 | A1 | 12/2003 | Marks et al. |
| 2004/0009810 | A1 | 1/2004 | Moody |
| 2004/0023715 | A1 | 2/2004 | Luciano et al. |
| 2004/0077408 | A1 | 4/2004 | D'Amico et al. |
| 2004/0082384 | A1 * | 4/2004 | Walker ................ G07F 17/3239 463/40 |
| 2004/0121833 | A1 | 6/2004 | Mezen et al. |
| 2004/0235551 | A1 | 11/2004 | Walker et al. |
| 2005/0003880 | A1 * | 1/2005 | Englman ................. G07F 17/32 463/16 |
| 2005/0014549 | A1 | 1/2005 | Baerlocher et al. |
| 2005/0020342 | A1 | 1/2005 | Palmer et al. |
| 2005/0056996 | A1 * | 3/2005 | Nordman ............ G07F 17/3202 273/143 R |
| 2005/0130737 | A1 * | 6/2005 | Englman ................. G07F 17/34 463/25 |
| 2005/0239542 | A1 * | 10/2005 | Olsen ...................... G07F 17/32 463/27 |
| 2006/0040723 | A1 | 2/2006 | Baerlocher et al. |
| 2006/0142077 | A1 * | 6/2006 | Miles ...................... G07F 17/34 463/20 |
| 2006/0264254 | A1 * | 11/2006 | Aoki ....................... G07F 17/32 463/20 |
| 2010/0016055 | A1 | 1/2010 | Englman |

OTHER PUBLICATIONS

Extended European Search Report in Application No. EP 06250334.7, dated Jul. 19, 2007.
Australian Examination Report in Application No. AU 2006200278, dated Mar. 5, 2009.
Australian Examination Report in Application No. AU 2006200278, dated Aug. 26, 2009.
Australian Examination Report in Application No. AU2010200282, dated May 25, 2011.
Australian Examination Report in Application No. AU2013206170, dated Apr. 10, 2015.
Australian Examination Report in Application No. AU2016213869 dated Jul. 14, 2017.

* cited by examiner

Figure 4
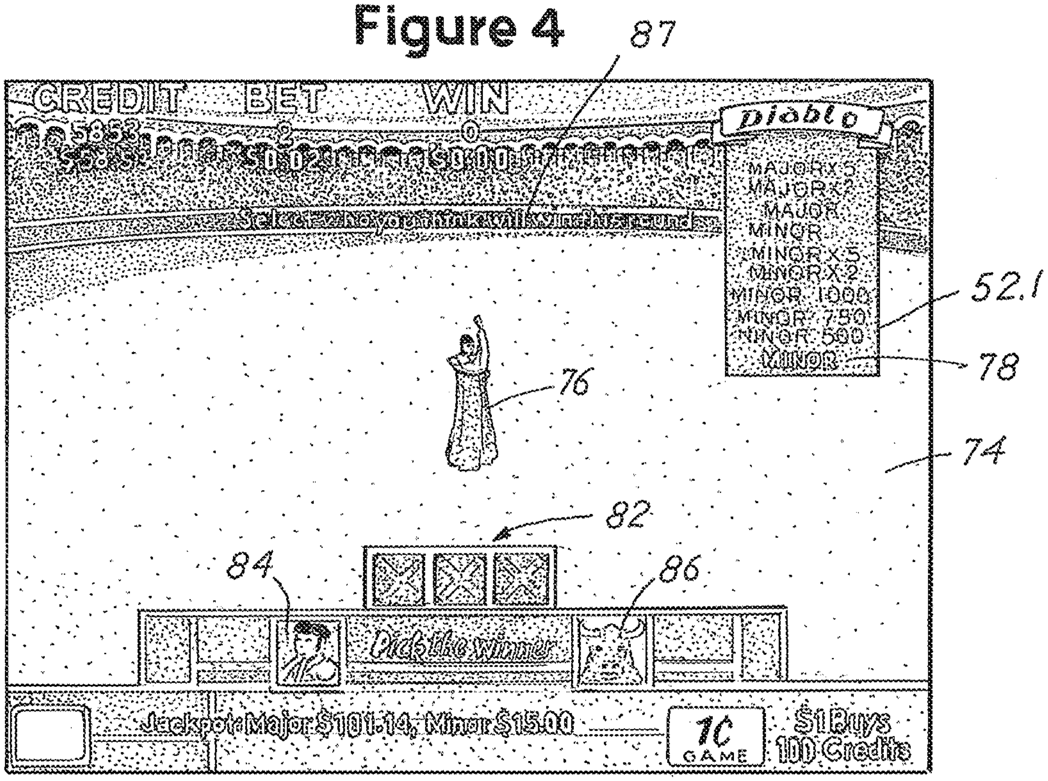
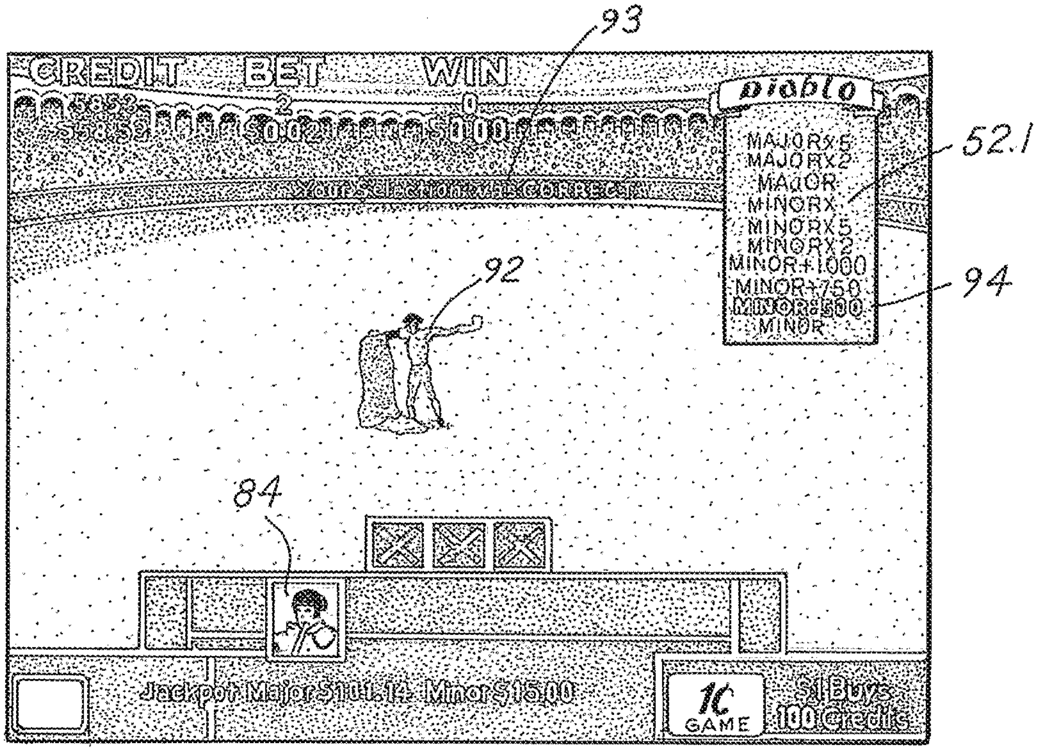
Figure 5

Figure 6
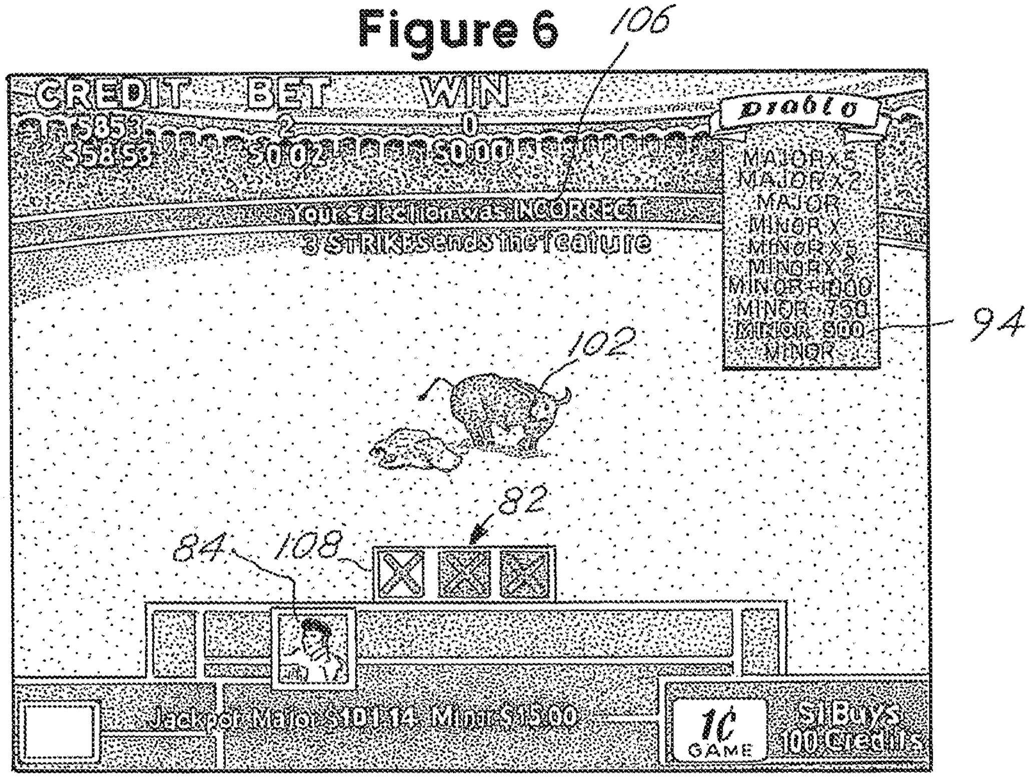
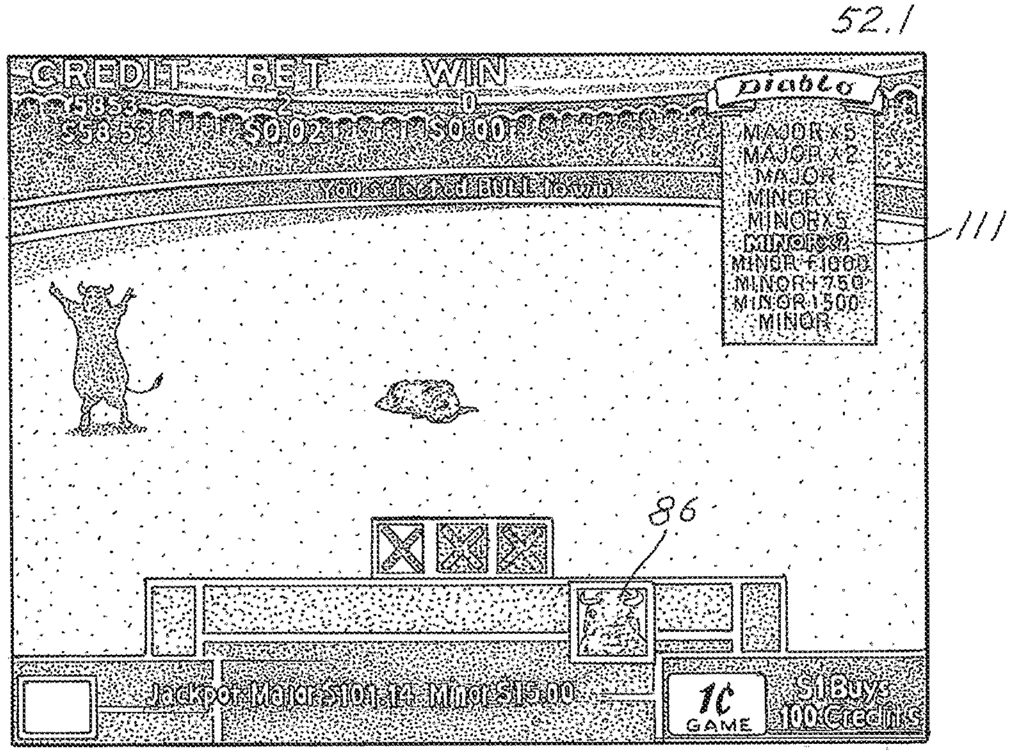
Figure 7

Figure 8
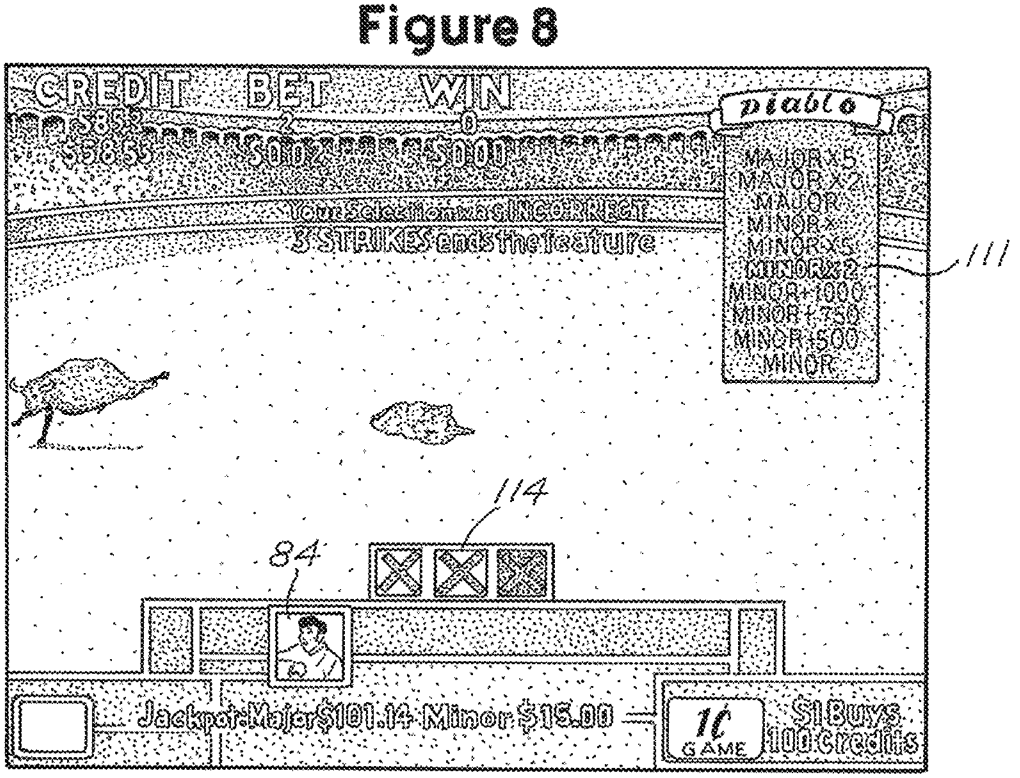
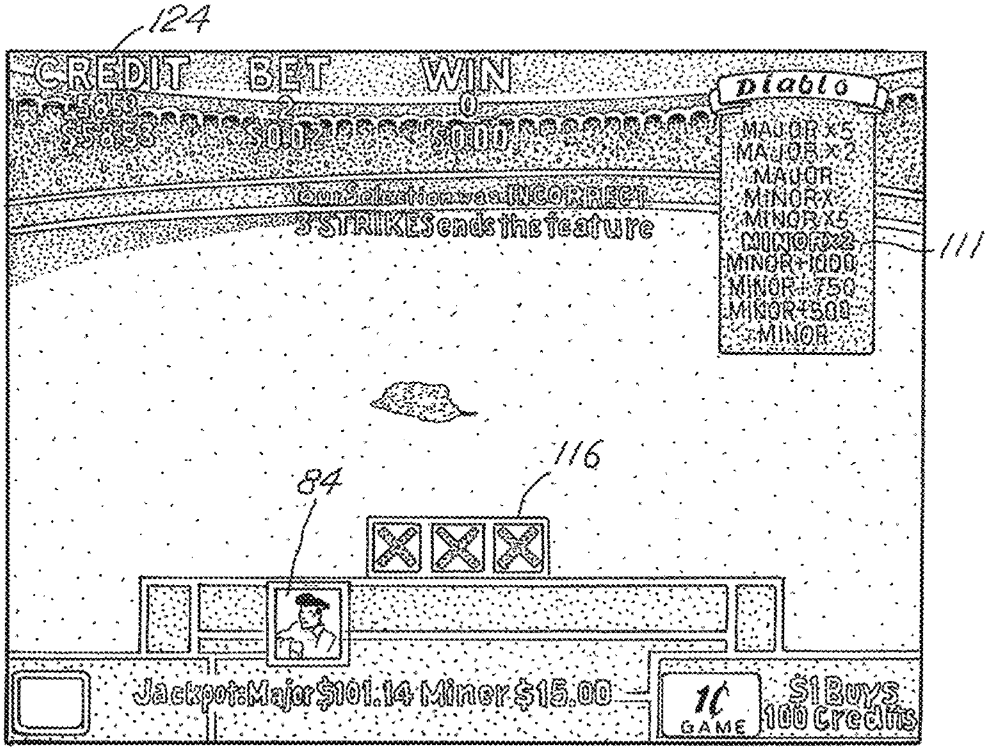
Figure 9

Figure 10
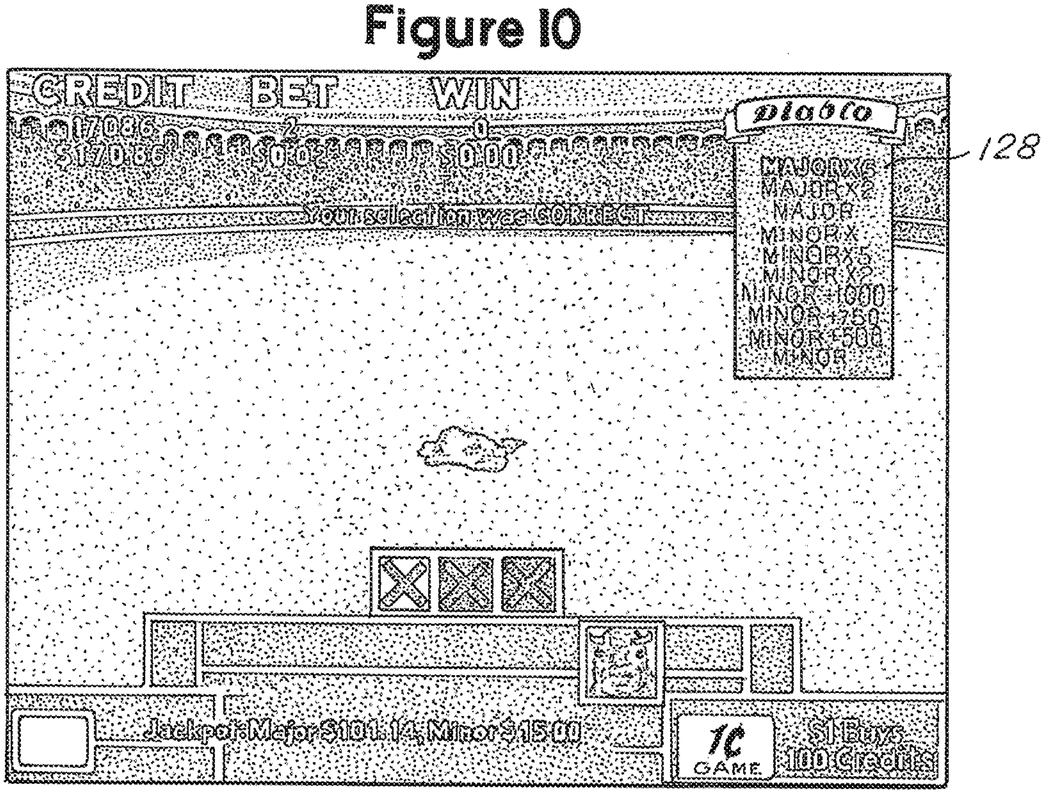
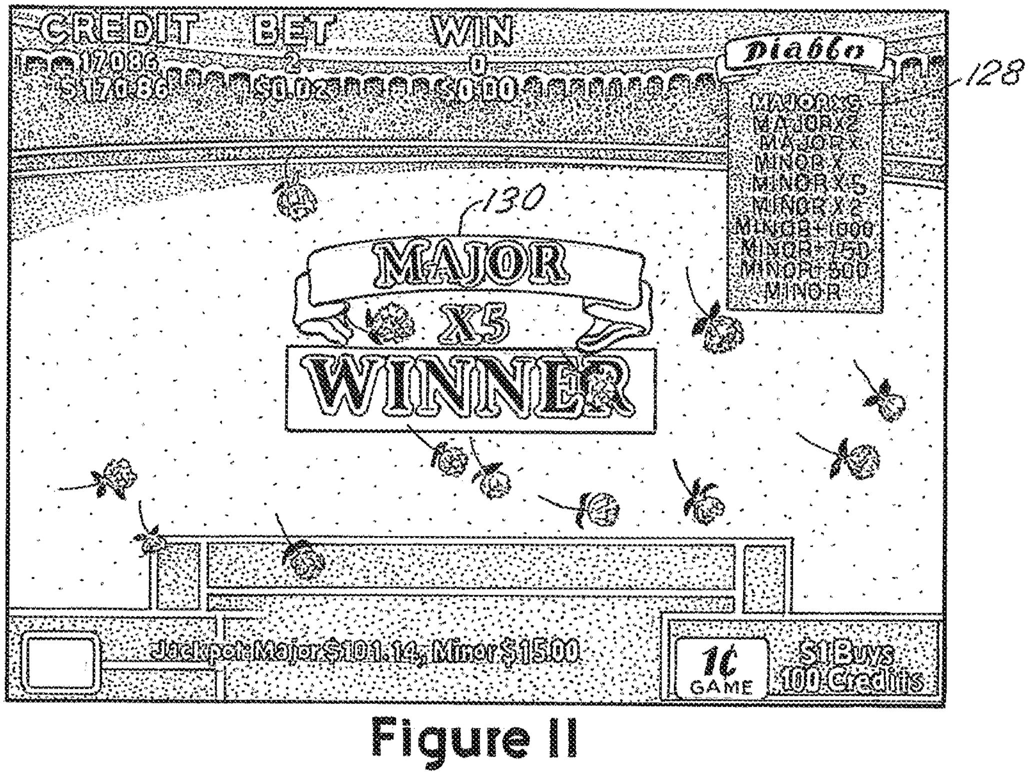
Figure 11

Figure 14
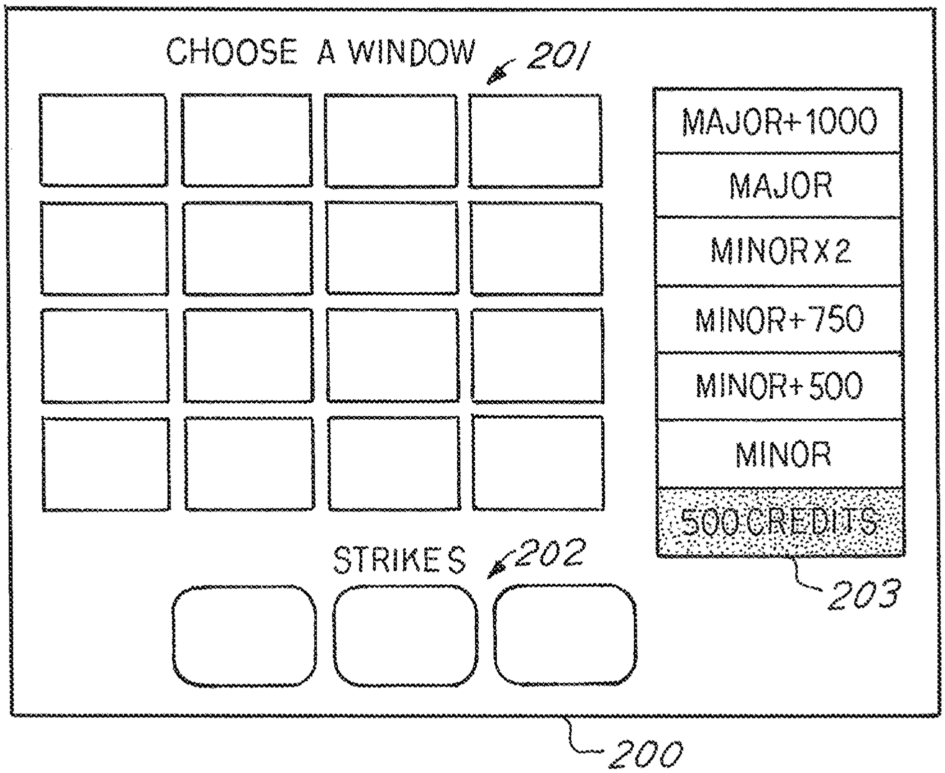
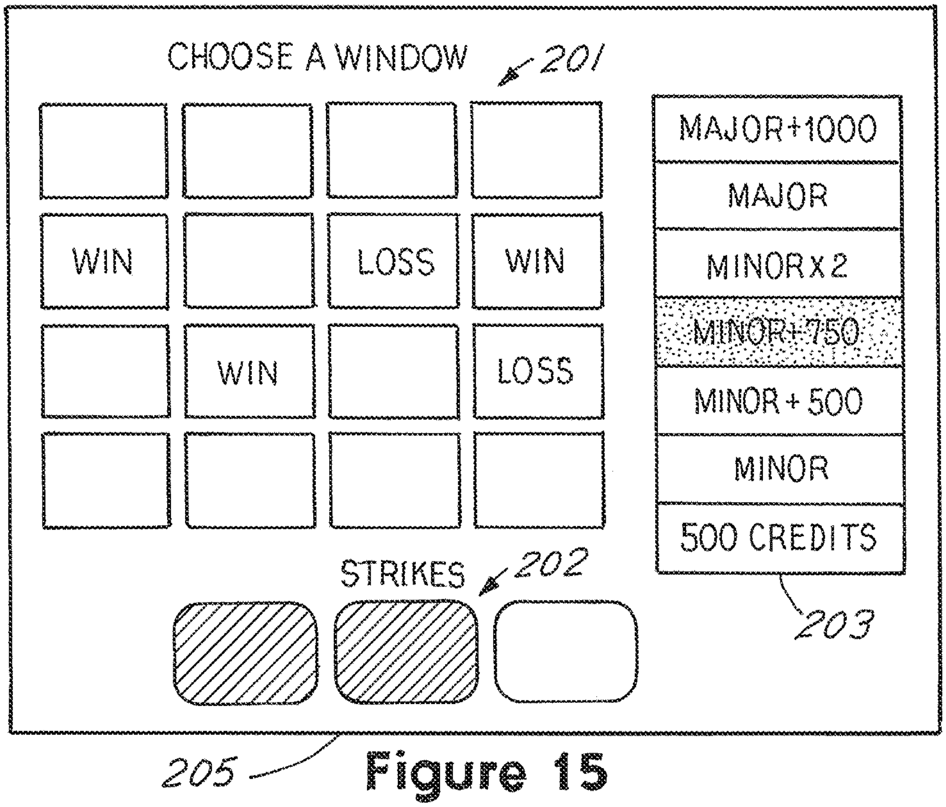
Figure 15

GAMING MACHINE WITH MODIFIED PRIZE FEATURE

CROSS-REFERENCE TO RELATED APPLICATIONS

The present application is a continuation of U.S. patent application Ser. No. 13/617,518, filed Sep. 14, 2012, which is a continuation of U.S. patent application Ser. No. 11/338,045, now U.S. Pat. No. 8,287,367, filed Jan. 23, 2006, which claims priority to Australian Patent Application No. AU2005900256, filed Jan. 21, 2005. The entire contents of the above-mentioned prior-filed applications are hereby expressly incorporated herein by reference.

FIELD OF THE INVENTION

The invention relates to a gaming system and to a method of gaming implemented by a gaming system. More particularly, but not exclusively, the present the invention relates to a gaming machine that implements a game with a prize feature.

BACKGROUND OF THE INVENTION

Players who regularly play gaming machines quickly tire of particular games and therefore it is necessary for manufacturers of these machines to develop innovative game features which add interest and variety to the games. In so doing, it is hoped to keep players amused and therefore willing to continue playing different varieties of games as well as to attract new players. Gaming machines of the type described are particularly well known nationally and internationally.

Substantial amounts of money are wagered on these machines. In the state of NSW and other states of Australia, there is a growing tendency to legalise the use of gaming machines by licensing operators with resulting revenue gains being achieved through license fees and taxation of moneys invested. The licensed operation of gaming machines is the subject of state legislation and regulation. Amongst the items regulated is the minimum percentage payout for a gaming machine. For example, a minimum of 85% of monies invested must be returned as winnings and manufacturers of gaming machines must therefore design their machines around these regulatory controls. Therefore, the options available to a gaming machine manufacturer are limited by the gaming regulations of the applicable jurisdiction and by requiring the gaming machine provide a particular return to player.

Various gaming machines incorporating prize ladders having a progression of increasing cash prizes terminating in a maximum prize, such as a progressive cash pot, are known. A player starts with the lowest prize and progression up the ladder continues for as long as the player wins the intervening games between the prizes on the ladder. As soon as there is a loss, the player exits the prize ladder feature and is awarded the prize on or below the level currently occupied. In some cases, the player may be given the choice as to whether he or she wants to claim the current prize or to attempt to advance to the next level, with a failed attempt resulting in the player either not winning a prize at ail or winning a prize lower down on the ladder.

When designing a game having a ladder format, the mean return to player is determined and the prizes and probabilities of occurrence are then calculated so as to achieve the required return to player. This requirement results in there being relatively little flexibility in the way that standard ladder formats can be implemented and a limited opportunity for extended play in a game having a ladder format. In particular, standard ladder formats involving games with a 50:50 outcome are relatively inflexible, in that if the prizes on the ladder increase too quickly, by doubling or nearly doubling in value, the ladder will be too short, whilst if the prizes increase too slowly the player will not be getting an attractive return commensurate with the odds of the intervening games. The restriction on the number of prices and incremental values in a ladder format therefore restricts the ability of gaming machine designers and manufacturers ability to implement new games.

It is therefore an object of the present invention to overcome or alleviate at least one of the aforementioned problems in gaming machines at present, or at least to provide the public with a useful alternative.

SUMMARY OF THE INVENTION

According to a first aspect of the invention there is provided a gaming machine having a display and a game controller arranged to control images on the display, the game controller being arranged to play a game wherein random events are caused to be displayed on the display and, if a predefined winning event results, the machine awards a prize, the gaming machine further comprising a feature game including a series of prize outcomes and a series of intervening games which provide a player with a chance of advancing to a subsequent prize outcome in the event of a winning outcome in an intervening game, and monitoring means for monitoring and indicating the number of non-winning game outcomes and triggering a penalty event in the event of the non-winning outcomes exceeding a threshold number.

In broad concept, this aspect of the invention may extend to an award feature including a series of prize outcomes, a series of intervening games, with at least one game between each prize outcome, each game providing a player with a chance to advance to a subsequent prize outcome, wherein in the event of not winning an intervening game, a player is given a number of chances before a penalty event is triggered.

The penalty event may comprise exiting from the game feature, either with or without an award, which is typically the current or immediately preceding prize outcome.

The non-winning event preferably comprises a loss outcome, though it may also include a draw outcome in the intervening game.

The award outcomes are preferably successively incrementing award outcomes.

The intervening games may include challenge or competition-type games where a possible winner is player- or machine-selectable, or fixed. The games may be two state games where the odds of selecting either winner are even, or weighted.

According to a second aspect of the invention, there is provided a gaming system having a display and a game controller arranged to control images on the display, the game controller being arranged to play a game wherein random events are caused to be displayed on the display means, and, if a predefined winning event results, the gaming system awards a prize, the gaming system having access to a progressive, and further comprising a game feature that is triggered during play of the game and during which said progressive is awardable, the award that is awarded to the player on award of the progressive being the progressive modified by a prize modifier.

Preferably, the gaming system has access to at least two progressives, each progressive being modifiable by at least one associated prize modifier.

Preferably, the game feature further comprises selecting said prize modifier from a plurality of prize modifiers dependent on a variable in the game. The selection of said prize modifier may be a random selection. The selection of said prize modifier may be from a predefined set of prize modifiers, some of which are applicable only to a subset of the at least two progressives.

Preferably, the game feature comprises a series of prize outcomes and a series of intervening games which provide a player with a chance of advancing to a subsequent prize outcome in the event of winning an intervening game, wherein at least one of the individual prize outcomes arising from an intervening game comprises said progressive modified by a prize modifier.

The game feature preferably includes at least one prize ladder.

The progressive prize modifier may include a multiplier, a bonus credit amount, or combinations thereof. The progressive prize modifier may also include at least one of a number of free games, a feature event, and a 'mystery' prize.

The game feature may include a plurality of prize ladders, with each ladder having a series of prizes which differ over those of the other ladders, and a selector for selecting a prize ladder to be played on.

The selector may be a machine-enabled random, pseudo-random or automatic selector, or a manual player-enabled selector, for enabling a player to choose the volatility of their feature. In this case, the ladders with the largest prizes may have proportionately lower chances of success/higher odds.

The different prize ladders may be representative of different selectable opponents or challengers.

The feature may be eligible to be triggered or may be triggerable in response to the placing of an ante-bet.

In one form of the invention, the prize ladders are modifiable in response to a player staking at least one ante-bet. In one embodiment, this is implemented by applying a multiplier, or bonus feature or value to a prize when it is awarded. In this case, the invention extends to a prize ladder having prize outcomes which are modifiable in response to ante-bet wagers.

The invention further provides a game to be played on a gaming apparatus of the type having a display and a game controller arranged to control images on the display, the game including a game feature which is triggerable in the event of a trigger condition existing in a base game, the game feature including a series of prize outcomes and a series of intervening games which provide a player with a chance of advancing to a subsequent prize outcome in the event of winning an intervening game, wherein, in the event of not winning an intervening game, a player is given a threshold number of chances before a penalty event is triggered.

The game may extend to one in which at least one of the prize outcomes in respect of a single award includes a progressive prize or jackpot and a progressive prize modifier for modifying the progressive prize, the progressive prize modifier being selected from a group including at least one of the following, namely multipliers, bonus credit amounts and feature events, including free games.

The game may further extend to one in which the game feature includes a plurality of prize ladders, with each ladder having a series of prizes which differ over those of the other prize ladders, and a selector for selecting a prize ladder to be played on.

According to a third aspect of the present invention, there is provided a method of providing a game on a gaming system having a display the method comprising controlling the gaming system to:

play a game wherein random events are caused to be displayed on the display;

monitoring game play of the game for at least one winning event and on the occurrence of said at least one winning event, awarding a prize;

play a feature game comprising a series of prize outcomes and a series of intervening games;

monitoring game play of the intervening games for at least one outcome and on the occurrence of said at least one outcome advancing to a subsequent prize outcome in the series of prize outcomes;

monitoring game play of the intervening games for at least one further outcome, different from said at least one outcome, and triggering a penalty event on the occurrence of said at least one further outcome exceeding a threshold number; and display on the display representations of game play of the game and feature game.

According to a fourth aspect of the present invention, there is provided a method of providing a game on a gaming system having a display the method comprising controlling the gaming system to:

play a game wherein random events are caused to be displayed on the display;

monitoring game play of the game for at least one winning event and on the occurrence of said at least one winning event, awarding a prize;

play a feature game during which a progressive prize is awarded;

prior to awarding the progressive prize, applying a prize modifier to the progressive prize and causing the progressive prize as modified by the prize modifier to be awarded.

Preferably, the feature game comprises a series of prize outcomes and a series of intervening games and the method further comprises:

monitoring game play of the intervening games for at least one outcome and on the occurrence of said at least one outcome advancing to a subsequent prize outcome in the series of prize outcomes;

wherein at least one of the prize outcomes in the series of prize outcomes consists of said progressive prize as modified by the prize modifier.

BRIEF DESCRIPTION OF THE DRAWINGS

The invention will now be described by way of example only with reference to the accompanying drawings in which:

FIG. 4 stows a new winner selection screen display for a selected prize ladder of the feature game;

FIG. 5 shows a subsequent screen display of the game series in which the player has won and progressed up the prize ladder;

FIG. 6 shows a subsequent screen display of the game series in which a player has lost;

FIG. 7 shows a subsequent screen display of the game series at the end of three successful attempts;

FIG. 8 shows a subsequent screen display of the game series at the end of a second unsuccessful selection;

FIG. 9 shows a screen display of the game series at the end of a third loss or unsuccessful selection which results in the feature ending;

FIG. 10 shows a screen display of the game series in which the player has advanced to the top of the prize ladder;

FIG. 11 shows a subsequent screen display in which the player is announced as a major winner;

FIGS. 12, 12*a* and 12*b* shows a flowchart of the first embodiment of the game played on the gaming machine of FIG. 1 as implemented in game logic on the game controller.

FIGS. 14 and 15 show two screen displays diagrammatically showing an alternative embodiment of a game implemented by a gaming system, or in accordance with a method, of the present invention.

DETAILED DESCRIPTION OF THE EMBODIMENTS

Figure 1:
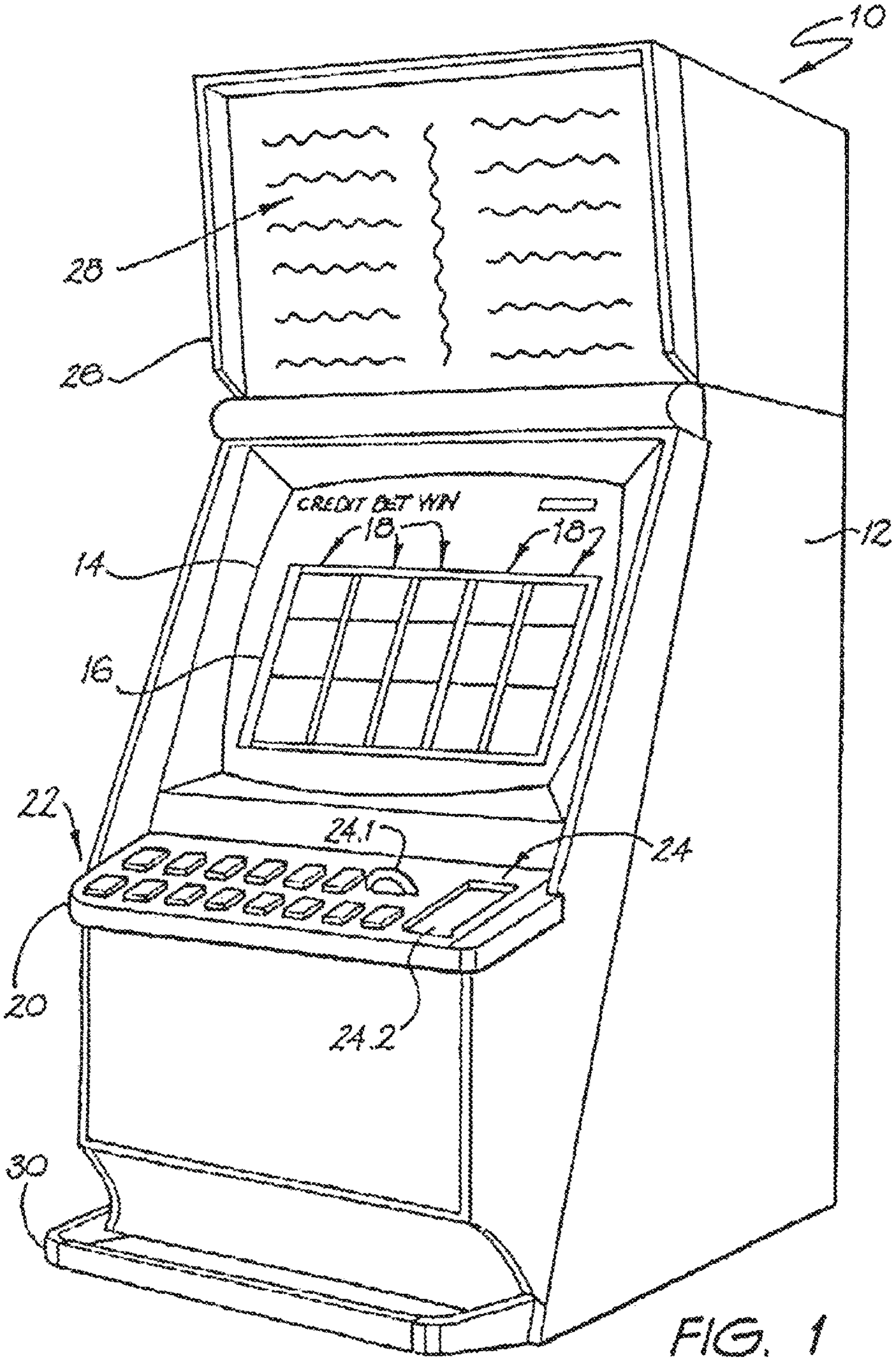
FIG. 1 shows a perspective view of a gaming machine in accordance with a first embodiment of the invention.

In FIG. 1, reference numeral 10 generally designates a gaming machine, including a game, in accordance with the invention. The machine 10 includes a console 12 having a display means in the form of a video display unit 14 on which a game 16 is played in use. The video display unit 14 may be implemented as a cathode ray screen device, a liquid crystal display, a plasma screen, or the like. The game 16 is a spinning reel game which simulates the rotation of a number of spinning reels 18, preferably from three to five, each spinning reel carrying a series of images or symbols.

A midtrim 20 of the machine 10 houses a keypad 22 containing buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc. A coin tray 30 is mounted beneath the console 12 for cash payouts from the machine 10.

Figure 13:
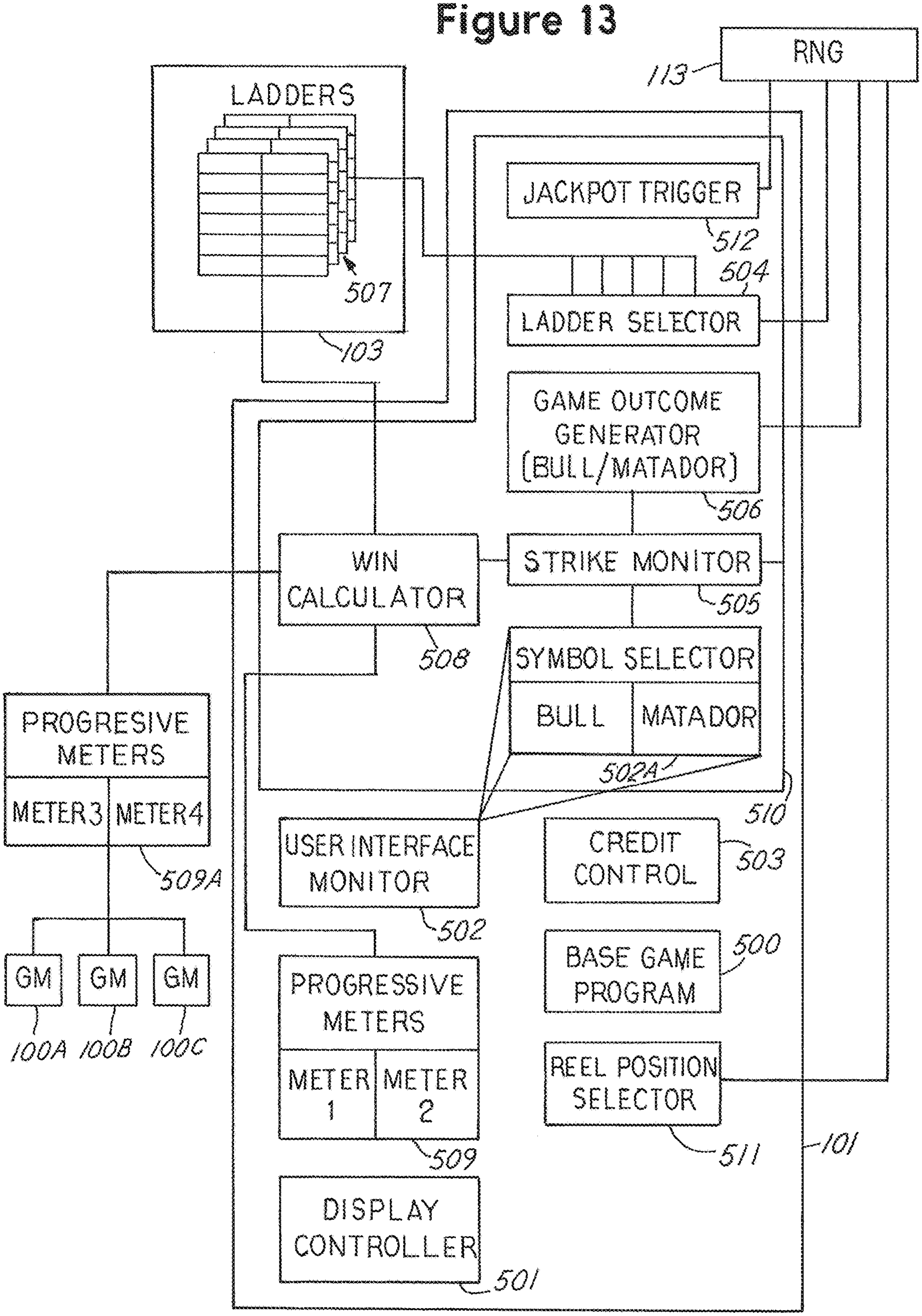
FIG. 13 shows a shows a functional block diagram of part of the processor/controller of the gaming machine of FIG. 1 and the gaming system shown in FIG. 2.

Referring to FIG. 13, a partial functional block diagram of a gaming system such as the gaming machine 10 is shown. The functions shown in the block diagram are performed by a controller 101, which is in communication with memory 103 and a random number generator (RNG) 113. The stopping position of each reel 18 is determined for a base game program 500 and matched with a predetermined associated reel position dependent on an output from the RNG 113. A reel position selector 511, which may be part of the base game program 500 performs the matching process. A display controller 501 controls the display of representations of the base game 500 and a feature game 510.

Figure 2:
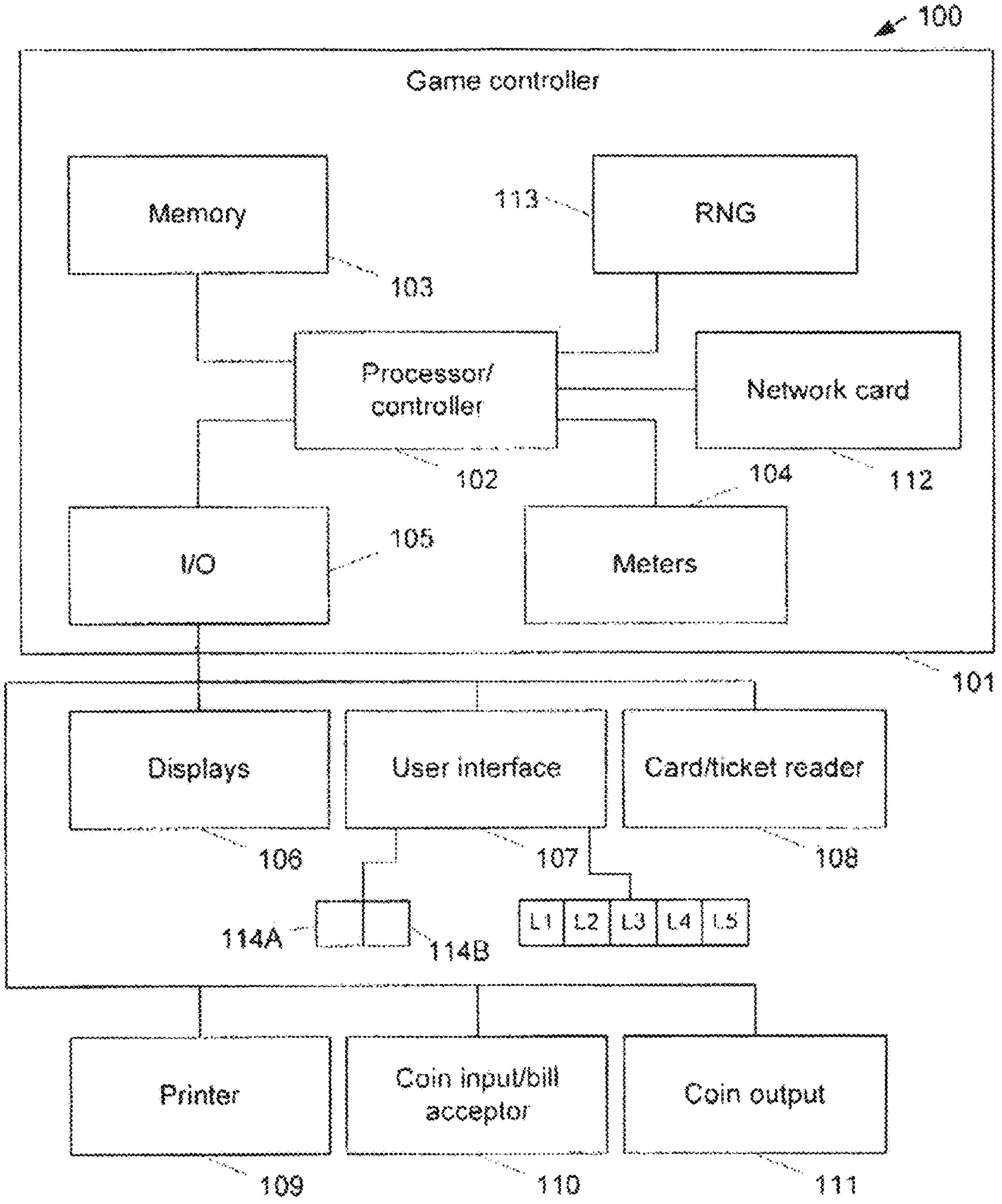
FIG. 2 shows a schematic block diagram of a gaming system suitable for implementing the present invention. The gaming system may be in the form of a gaming machine similar to the gaming machine shown in FIG. 1.

FIG. 2 shows a block diagram of a gaming system, generally referenced by arrow 100, suitable for implementing the present invention. The gaming system 100 may be, for example, a standalone gaming machine of the type shown in FIG. 1. However, the gaming system 100 may be a networked gaming machine or have distributed modules. Accordingly, different reference numerals have been used in FIG. 2 from FIG. 1 for components that may be equivalent.

The gaming system 100 includes the game controller 101, which includes a computational device 102 such as a microprocessor, microcontroller or programmable logic device. Where the gaming system 100 is a gaming machine, the game controller 101 will typically be provided entirely within the gaming machine. In other gaming systems, the controller may have some or all of its component parts separated from the display and user interface.

Instructions and data to control operation of the computational device 102 are stored in the memory 103, which is in data communication with the computational device 102. The instructions for the computational device 102 result in the computational device 102 having various functions in the normal manner. The main functions of the computational device 102 are shown in FIG. 13 and are further described herein below with additional reference to FIGS. 3 to 11, which show a series of screen displays from an example gaming system implemented in accordance with the present invention, and with reference to FIG. 12, which shows a flow diagram of a processes controlled by the computational device 102.

Typically, the gaming system 100 will include both volatile and non-volatile memory and more than one of each type of memory, with such memories being collectively represented in FIG. 2 by the memory 103. In addition, the functions of the computational device 102 may be separated into separate modules. The instructions to cause the game controller 101 to implement the present invention will be stored in the memory 103.

The gaming system 100 may include hardware meters 104 for the purposes of regulatory compliance and also include input/output ports 105 for communicating with the peripheral devices of the gaming system 100. In FIG. 2, the peripheral devices that communicate with the controller are one or more displays 106, user interfaces 107, including in particular a selector 114A, 114B for allowing selection of a matador or a bull (see herein below), card and/or ticket readers 108, printers 109, coin input mechanism and/or bill acceptor 110 and a coin output mechanism 111.

In addition, the gaming system 100 may include a communications interface, for example a network card 112 to communicate with a network for such purposes as sending status information, accounting information and the like to a central controller, allowing communication from the central controller to the gaming system 100, for communicating across a network to a monitor of a linked progressive jackpot, or for other purposes.

The outcomes of the gaming system, in accordance with the game process implemented by the gaming system as described herein below, are determined by the random number generator (RNG) 113. Various random number generators suitable for use in a gaming system will be known by the normally skilled person in the relevant arts. Therefore the RNG 113 will not be described further herein. In some implementations of the present invention, the RNG 113 may be part of the computational device 102. The RNG 113 may not necessarily consist of a single number generator.

Figure 2A:
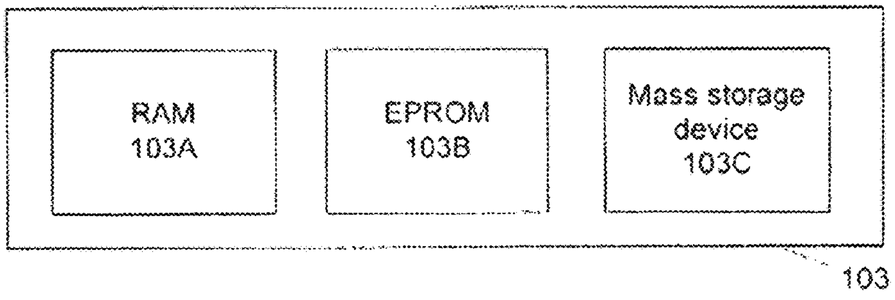
FIG. 2A shows a schematic block diagram of components of the memory of the gaming system of FIG. 2.

FIG. 2A shows an example of the main memory components that may comprise the memory 103. Each memory component will typically communicate with the computational device 102 through an address and data bus.

A random access memory (RAM) 103A may temporarily store programs that provide the computational instructions for the computational device 102 and also temporarily store data related to execution of the programs. An EPROM 103B may store a boot program for the game controller 101 and may also store instructions for the loading of programs from a mass storage device 103C. The mass storage device 103C may be, for example, a hard drive, CD, DVD, static RAM, flash drive, EPROM or the like. Some programs may be stored in the EPROM 103B.

A description will now be given of the operation of the present invention. The following description assumes that the present invention is implemented by the gaming machine 10, but as explained herein above, the present invention may be implemented in other gaming systems.

Figure 3:
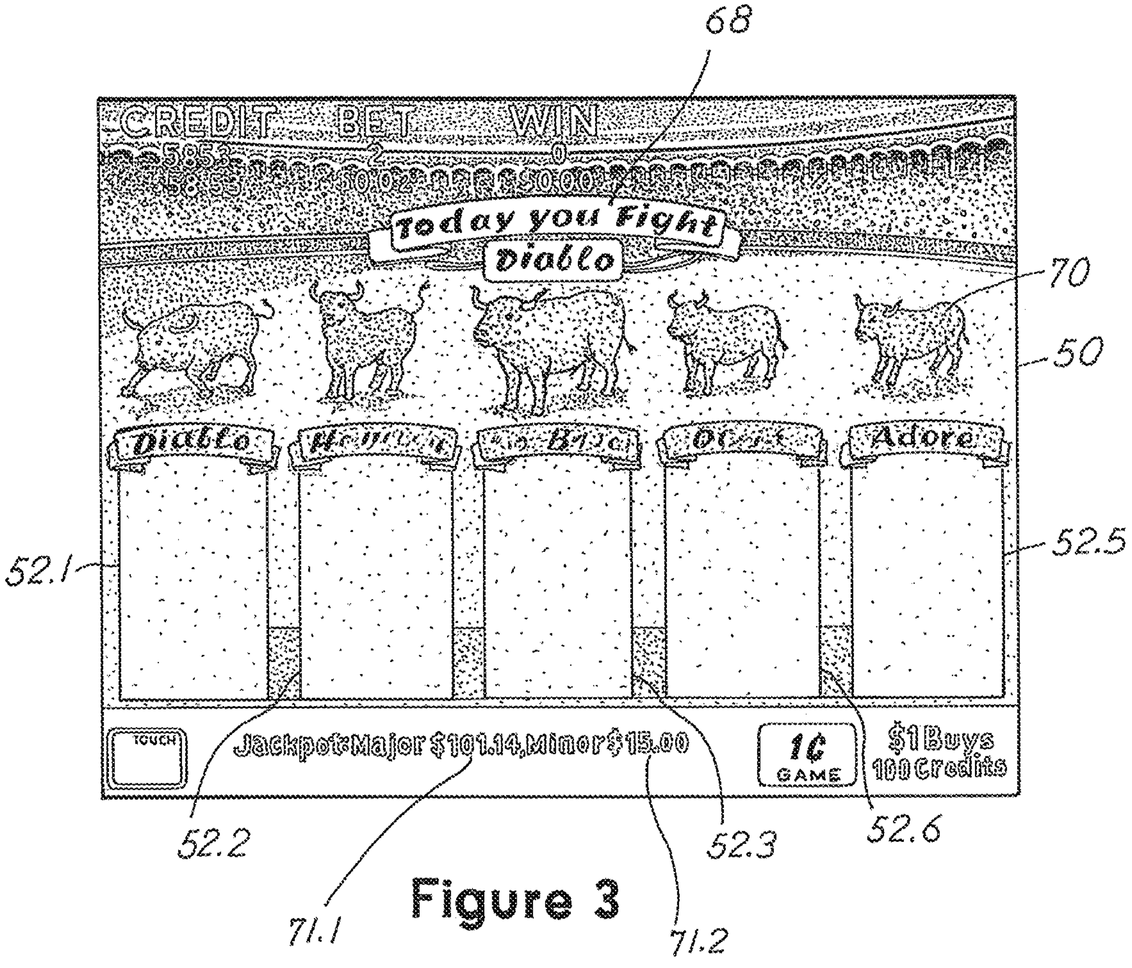
FIG. 3 shows a selection screen display of a game feature of a first embodiment of a feature game of the invention following a base game.

Referring now to FIG. 3, when the feature is triggered, a prize ladder selection screen 50 is displayed showing five different prize ladders 52.1 to 52.5, in this case corresponding to different bulls that can be selected for a matador to fight.

Figure 12A:
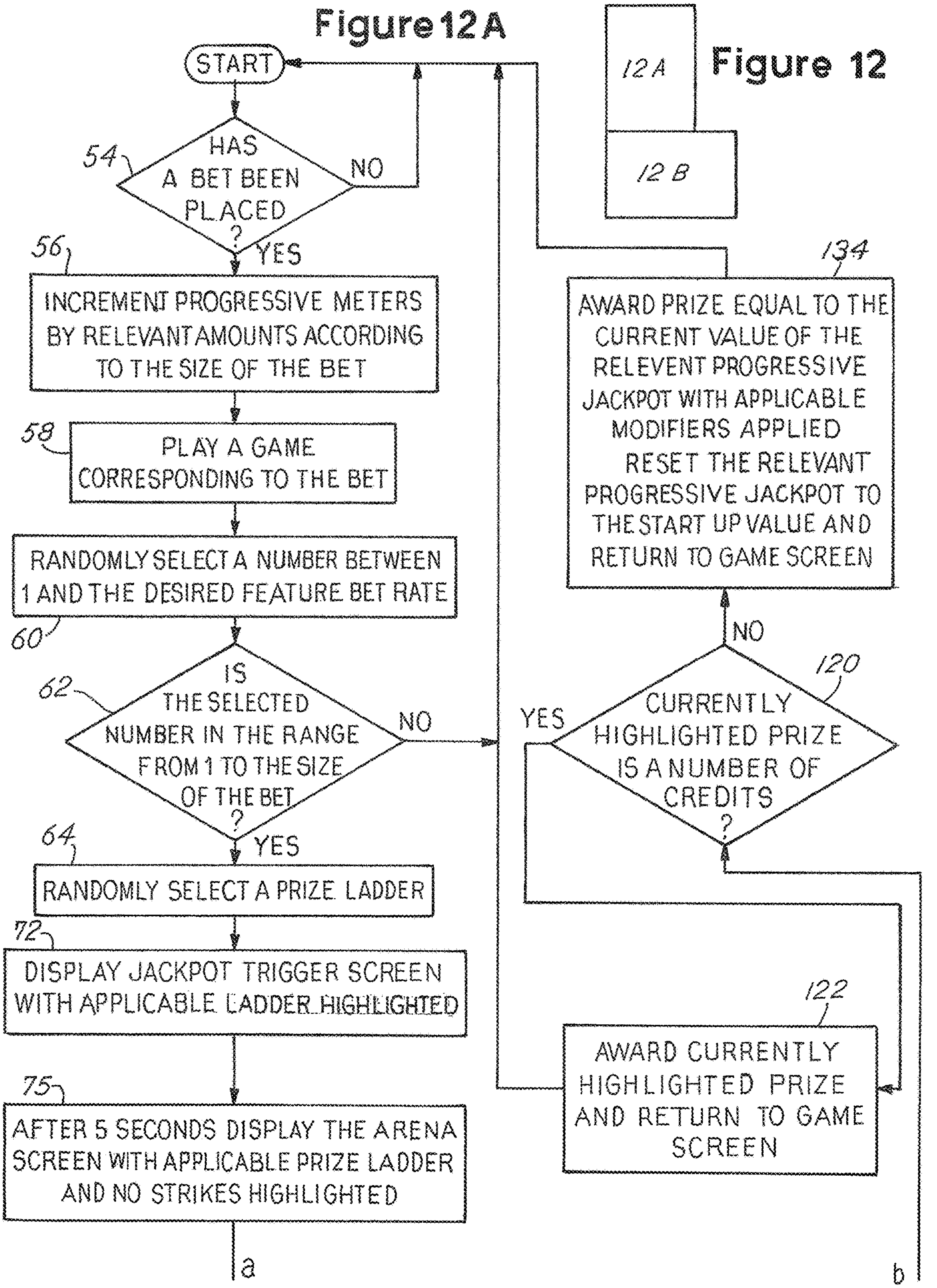
Figure 12B:
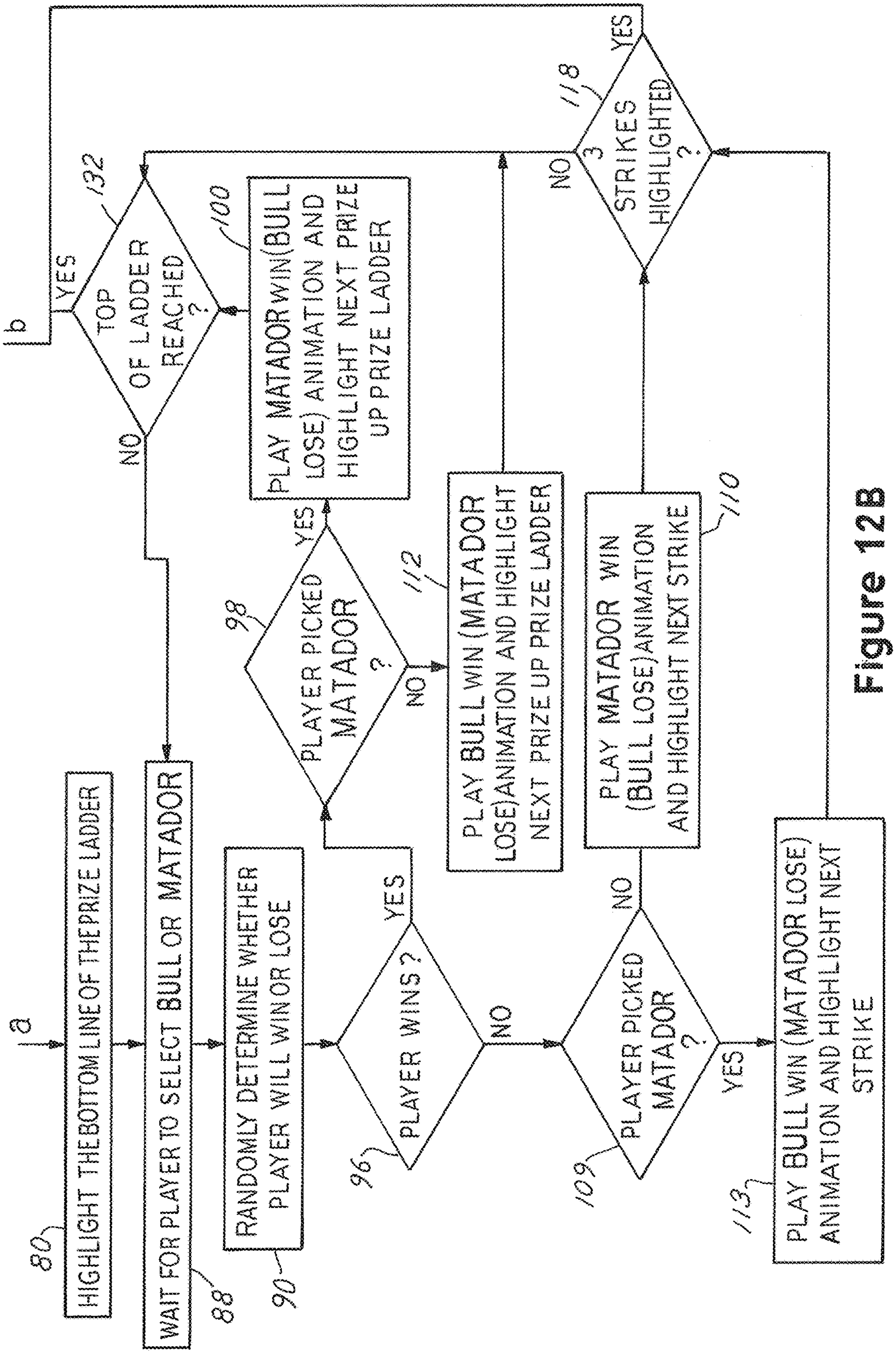

The feature may be triggered in a number of ways. In this specific embodiment, as is illustrated in the flowchart of FIG. 12, after a bet has been placed to play the base game at stop 54, a progressive meter 509 (see FIG. 13) is incremented by relevant amounts according to the size of the bet (step 56) along the same lines as the Hyperlink™ feature, which forms the subject of the applicant's Australian patent 754689. Alternatively, a progressive meter for linked gaming machines may be used and accessed through the network card 112. In FIG. 13, linked progressive meters 509A are contributed to by an additional three gaming systems 100A, 100B and 100C, all, some, or none of which may implement games in accordance with the present invention.

After a base game 500 corresponding to the bet has been played at step 58, a number between one and the desired feature hit-rate (say one thousand) is randomly generated by the RNG 113 and received at 60 by a jackpot trigger module 512 (see FIG. 13) of the controller 101. In the event of the selected number being in the range from one to the size of the bet at step 62, the prize ladder selection screen 50 may be displayed, and a prize ladder is randomly selected at step 64 by the ladder selector 504. As can be on the selection or jackpot trigger screen 50, the "Diablo" bull prize ladder 52.1 has been randomly or pseudo-randomly selected, and a message 68 confirming the selection appears on the screen.

It is clear on reviewing the prize ladders 52.1 to 52.5 that they range from the "Diablo" prize ladder 52.1 carrying the largest series of prizes to the "Adora" prize ladder 52.5 carrying the smallest series of prizes. The corresponding bull images 70 above the prize ladders are representative of the value of the prize and/or the strength of the bull opponent. The selection may be a weighted selection, which is weighted towards the prize ladders 52.1 to 52.5 in reverse order.

In alternative embodiments the player may be invited to select from the five prize ladders 52.1 to 52.5, thereby choosing the volatility of their feature, or only one ladder may be provided, in which case no selection is required. Where the player makes the selection, a user interface monitor 502 of the controller 101 monitors for the player's selection, which may be indicated by touching one of five touch pads L1-L5 provided as part of the user interface 107 (FIG. 2) on the display 14, by depressing a button in the bank of buttons 22, or otherwise. In this embodiment, the odds of advancing up ladders with the largest prizes will be proportionately increased so that the return to player percentage is not affected by the player's selection.

A short time interval (approximately 5 seconds) after the prior selection screen 66 has been displayed at step 72, a first feature game playing "arena" screen 74 (see FIG. 4) will be displayed (step 75). The screen shows the matador 76 in the centre of the ring and the "Diablo" prize ladder 52.1 at the top right hand corner. The bottom minor jackpot prize 78 will be highlighted (step 80) to show the player which prize they are currently competing for.

A three strike indicator area comprising three indicator blocks 82 is provided on the screen for collection of the three strikes or chances. Once the threshold number of "strikes", in this case three, has occurred for equivalently a threshold of two strikes has been exceeded), the feature game may end, or some other penalty event may occur.

The indicator blocks 82 are lit under the control of a strike monitor 505 (see FIG. 13), which monitors the play of the feature game 510 for 'strikes'. Below the strike indicator areas respective matador and bull images 84 and 86 are displayed which are touch screen activated and monitored by the user interface monitor 502, particularly a symbol selector monitor 502A that forms one part of the user interface monitor 502 and which monitors the selector 114A, 114B, for allowing the player, invited by message 87, to select whether the bull or the matador will win in the first round. The control logic waits for the player to select the bull or the matador at step 88, and then randomly determines at 90, with even odds, whether the player will win or lose.

On the screen 50 in FIG. 3 and on the subsequent screens are shown both Major and Minor jackpot values 71.1 and 71.2 ($101.14 and $15.00 respectively) which are applied to the prize values. Both the Minor and Major jackpots may be stand-alone jackpots that increment as a percentage of turnover of the gaming machine 10, or linked, progressives contributed to by a plurality of gaming machines.

Referring now to FIG. 5, after the player has selected the matador 84 by touching the relevant area of the screen or pressing the corresponding button, the matador remains highlighted on the screen to show the selection, a game outcome generator 506 receives an output from the RNG 113 and selects either the matador or the bull and then an animation occurs that indicates the result of either the matador or the bull winning.

In FIG. 5, a matador win animation 92 is displayed, a 'Your selection was CORRECT' message 93 appears and the highlighted prize moves up one position to the next MINOR+500 prize 94 on the prize ladder 52.1 in which the award represents the Minor jackpot of $15.00 incremented by 500 credits ($5.00). This particular sequence is represented at steps 96, 98 and 100 in the flow diagram. The definition of the ladders is held in memory 103 and the definitions are represented graphically in FIG. 13 by reference numeral 507.

The selection invitation message 87 then reappears and the player makes another choice to guess who will win the second round. In the next screen display of FIG. 6, the player selected the matador 84 again, but the bull wins as is indicated at animation sequence 102. The prize ladder stays at the MINOR+500 position 94, a message 106 tells the player that their selection was unsuccessful, the strike monitor 505 notes the outcome and the display controller 501 causes one strike marker 108 to appear in the first of the strike boxes 82. The underlying logic is illustrated at steps 109 and 113 in the flowchart of FIG. 12. The logic sequence followed after a loss in which the player incorrectly selects the bull is similar and is illustrated sequentially at steps 109 and 110. As three strikes have not yet been highlighted, and the top of the ladder has not been reached (subsequent decision steps 118 and 132), the Bull/Matador selection step 88 is returned to.

The process continues, say, to a point where the screen of FIG. 7 is displayed, in which the player has had three more successful attempts to advance to the MINOR×2 prize 111 on the prize ladder 52.1, by virtue of the player having successfully selected the bull 86 to win. The underlying logic is illustrated on the flowchart at steps 98 and 112.

For the next round represented in the screen of FIG. 8, the player selects the matador 84, but the bull wins and therefore the prize ladder remains unchanged at the MINOR×2 prize level 111, the 'selection INCORRECT' 106 message is played, and a second strike 114 is collected, and highlighted, with the same logic sequence of steps 109 and 110 being followed, and with the strike number accumulating to two.

In the following round illustrated in the screen of FIG. 9, a player selects the matador 84 again, but once again the bull wins. The third strike 116 is then highlight and collected which results in the feature terminating, as is indicated in the sequence of logic steps 118, 120 and 134. Since the strike monitor 505 has now identified three strikes, at 134, the prize that will be awarded to the player is therefore at the current level 111 of the prize ladder, namely the value of the minor progressive jackpot×2. Since the minor progressive jackpot is currently at $15 the win that is awarded by the controller 101 as determined by a win calculator 508 based on the definition of the ladders 507 will be $30. A win celebration animation and sounds will be played and the win will either by payed to the gaming machine credit meter by a credit control module 503 (FIG. 13) of the controller 101 and as illustrated at 124 or else paid to the player via an attendant pay. Alternatively, if, as is shown in the screen of FIG. 10, the player manages to make it all the way to the top of the prize ladder 52.1 without getting three strikes, they are awarded the top MAJOR×5 prize 128, which amounts to the major jackpot of $101.14×5, namely $505.70.

As is clear from FIG. 11, a major winner message 130 then appears on the screen with appropriate rose graphics and music. The underlying logic sequence necessary to arrive at a major winner result is illustrated sequentially on the flowchart of FIG. 12 at steps 112, 132, 120 and 134. At step 134, it is noted that the progressive jackpot is reset to the start-up value before the base game screen is returned to.

In all of the prize ladders 52.1 to 52.5, the quantum of prize values are modified so that they did not just reflect a series of progressively increasing bonus credit amounts or a series of increasing multipliers applied to the amount wagered terminating in a jackpot. Rather, multipliers and bonus credit amounts are applied to major and minor jackpot values as a player advances up the prize ladder. In addition, feature events, (such as the award of additional bonus games) may also form part of the prize ladders. A single prize outcome could, for example, include a combination of a minor jackpot and five free games.

The provision of modified prize values permits greater flexibility in providing prizes to the player, allowing an increased number of prizes in the ladder over, for example, offering some fixed credit prizes and the progressive prizes (typically one or two) that may be available. Although the examples provided herein provide prizes in credits alone, a non-credit prize may be used to modify a progressive. For example, the largest prize offered might be the highest paying progressive plus a car.

FIGS. 14 and 15 show screen displays 200 and 205 respectively of an alternative feature game according to the present invention. The alternative feature game has a game outcome monitor, strike monitor, a symbol selector and a win calculator, all implemented by the controller 101 to perform similar functions as the corresponding functional components of the feature game 510, but in an appropriate way for the alternative feature game. The screen display 200 shows a "pick-a-box" type game, in which the player selects boxes or windows 201, which can reveal either a winning symbol, which results in progression up a ladder 203 defined in memory 103 and displayed on the display, or a losing symbol, in which case the strike monitor increments its count of strikes and determines if the feature game is to end. The strike monitor is again in this example represented on screen by three strike indictors 202.

The symbol selector allows selection from the windows, there being 16 windows in the examples. The game outcome generator for the alternative feature game may define the symbol to be revealed by each window if selected at the commencement of the feature game, or alternatively, the game outcome generator may define the symbol to be revealed on the selection of a window based on a predetermined probability. In the latter case, a look-up table may be defined in memory 103 that is populated with the symbols in proportions representing their required frequency of occurrence. The game outcome generator may then select a position in the table based on an output from the RNG 113.

The screen display 200 shows the feature game at its commencement, with none of the windows having been selected and the prize ladder located at the lowest prize of 500 credits, which may be equal to or slightly less than a seed value for a minor progressive, which is the next prize outcome in the series of prize outcomes represented by the ladder 203. Further prizes, including progressive prizes and progressive prizes with a modifier are included in the ladder 203.

In screen display 205, the player has selected five windows 201, with three windows revealing a "winning" symbol and two revealing a "losing" symbol. Therefore, the prize ladder 203 is located at the fourth prize in the series and two of the three strike indicators 202 have been illuminated. The game ends when the player selects one more window with a losing symbol. If this occurred on the next selection, the player would be awarded the minor progressive (which may be a linked progressive) plus 750 credits.

In one embodiment of the present invention, some of the windows 201 may be neutral, not "winning" or "losing" as described above, but performing some other function in the feature game. For example, some windows may reveal an "instant" credit prize. Another type of window may allow more strikes, for example by deleting a pre-existing strike, or by allowing four strikes, when previously three strikes ended the feature game. In the matador versus bull type game, a third outcome may be provided that provides one of these other types of prizes.

In addition, the gaming machine and the game of the invention may include an ante bet game, in which the player can stake different bets in order to apply different prize modifiers to the progressive prizes. For example, when playing the standard game if may be possible to win one or more progressive prizes, and by staking one or more different ante bets the progressive prizes may be multiplied or have bonuses added when they are awarded.

The strike feature allows the prize values to be adjusted in such a way that there is a more gradual progression up the prize ladder which is acceptable to players, in particular where there are even odds of progressing to the next step in the ladder, and the progressive modifier feature provides a larger range of dynamic prizes which can be applied to the prize ladder. The inclusion of prize modifiers in a ladder provides the further advantage that a large spread of progressive prizes can be provided that include a fixed number of progressive jackpot levels and still be sequential in value. Modifying the progressive prizes overcomes the problem that fixed credit prizes cannot, at least without significant restrictions on the progressive prizes, be included with values falling in between the different progressive levels because the progressive values are dynamic. By applying a modifier to a progressive value, it is guaranteed that the ladder contains sequential prizes that can sit between other progressive prize values.

In addition to special game features such as free games being awarded in respect of prizes on the progressive prize ladder bonuses may be applied during the base game for a number of games or period of time in addition to the progressive prize being awarded. The progressive prizes may be stand-alone prizes, or may be linked progressive prizes linked to other gaming machines.

Figure 16:
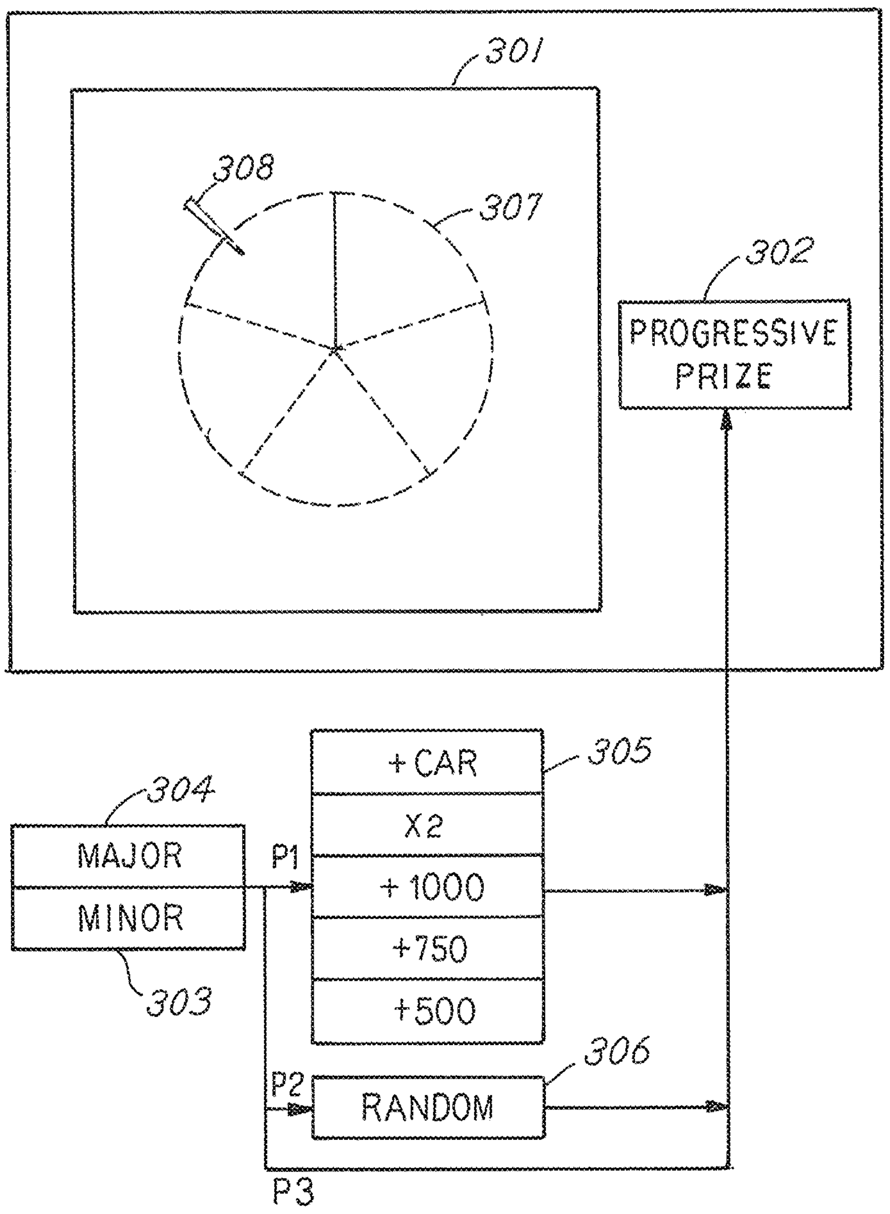
FIG. 16 shows a screen display diagrammatically showing a further alternative embodiment of a game implemented by a gaming system, or in accordance with a method, of the present invention.

FIG. 16 shows diagrammatically a screen display 300 showing a more general form of the present invention. The screen display 300 includes a game display 301, which displays representations of a game to a player under the control of the game controller 101. The game displayed in the game display 301 is typically a feature game of a gaming machine. While a spinning wheel type game is shown in FIG. 16, this is provided merely as an example and other formats of feature game can be used. In addition, a progressive prize display 302 is provided to inform a player of a progressive prize that they have won. The progressive prize display 302 is also displayed under the control of the game controller 101 and may be displayed permanently during the game or only when a progressive prize has been won.

In the example shown in FIG. 16, the gaming machine 10 maintains two progressive jackpots, a minor progressive 303 and a major progressive 304. The two progressives 303, 304 may be maintained using any known technique.

In FIG. 16, the progressive prize amount of the minor progressive 303 or the major progressive 304, whichever has been won is subjected to one of three transformations indicated by arrows P1 to P3. Arrow P3 represents a unity transformation and represents the only option available in a traditional gaming system having a progressive.

In the first transformation indicated by arrow P1, the progressive is subject to a predetermined modifier 305. There may be one, or two or more predetermined modifiers 305 and in FIG. 16 five predetermined modifiers 305 are shown, ranging from add 500 credits to double the progressive and add a car prize. Where more than one predetermined modifier 305 is available, the particular modifier used may be determined based on an event in the game that is displayed in game display 301. For example, if the game display 301 showed a spinning reel game, the occurrence of three scatter symbols result in the add 500 predetermined modifier being used, whereas the occurrence of four scatter symbols may result in the add 1000 predetermined modifier being used. Other scatter symbols may result in the other predetermined modifiers being applied. Other events may determine what modifier 305 is applied.

Some of the predetermined modifiers may be only available to modify one of the minor progressive 303 or the major progressive 304. For example, the modifier 305 of add a car may be only available as a modifier to the major progressive 304, which is awarded less often than the minor progressive 303.

In the second transformation indicated by arrow P2, a random modifier 306 is selected. The random modifier 306 may be selected based on an output from the RNG 113. In one example, the random modifier 306 may be selected from a predefined set, for example the five modifiers 305, which may be weighted so that the higher value modifiers occur less frequently than the lower value modifiers. For example, if a spinning wheel 307 with a segment selector 308 was used, each segment of the wheel 307 could represent one of the five modifiers 305. The sizes of the segments could be varied to reflect the probability of selecting a particular modifier 305. In addition, different wheels may be displayed depending on which progressive is to be won.

In an alternative embodiment, the modifier could be any integer that is randomly selected within a predefined range.

In a gaming machine according to the present invention one or both of paths P1 and P2 may be available, optionally also with path P3. Where more than one path is available, the particular path selected will depend on variables in the game. For example, different paths may be available at different times, at different stages in the game or randomly selected for each award of a progressive.

If any path other than P3 is selected, the game controller 101 calculates the modified progressive prize to be awarded and displays this amount in the progressive prize display 302 and awards the modified progressive prize to the player, or initiates an award event that leads to the awarding of the modified progressive prize.

It will be understood that the invention disclosed and defined in this specification extends to all alternative combinations of two or more of the individual features mentioned or evident from the text or drawings. All of these different combinations constitute various alternative aspects of the invention.

It will also be understood that modifications and additions may be made to the present invention without departing from the scope of the invention as defined in the appended claims.

The invention claimed is:

1. A gaming system for displaying a game, the gaming system comprising:

a credit input operable to receive a physical item associated with a monetary value for establishing a credit balance, the credit balance being increasable and decreasable based at least on wagering activity;

a display device; and a game controller comprising a processor and memory storing a plurality of instructions, which, when executed, cause the game controller to at least:

control the display device to animate a progressive prize randomly selected from a plurality of progressive prizes included in a prize ladder in response to a winning game outcome in the game based on random numbers generated by a random number generator to provide a volatility, control the display device to animate the progressive prize being transformed based on one transformation path selected from a) a first transformation path using a predefined set of prize modifiers being predetermined and each of the predefined set of prize modifiers, when selected, changes a resulting event in the winning game outcome being displayed on the display device, b) a second transformation path using one of the predefined set of prize modifiers in the first transformation path randomly determined by the random numbers, and c) a third transformation path using a unity transformation representing the progressive prize, while providing the volatility, into a modified progressive prize,. while maintaining the volatility provided, and control the display device to animate the modified progressive prize.

2. The gaming system of claim 1, wherein the predefined set of prize modifiers selected is displayed on the display device during play of the game.

3. The gaming system of claim 1, wherein the predefined set of prize modifiers selected is displayed on the display device in association with a progressive prize value of the progressive prize selected.

4. The gaming system of claim 1, wherein the game is a bonus game, and wherein a base game is suspended when the bonus game commences.

5. The gaming system of claim 4, wherein the plurality of progressive prizes of the prize ladder are arranged from a smallest progressive prize value at a bottom of the prize ladder to a largest progressive prize value at a top of the prize ladder.

6. The gaming system of claim 5, wherein the instructions, when executed, further cause the game controller to control the display device to display the prize ladder in association with an indicator identifying one of the plurality of progressive prizes of the prize ladder as a current progressive prize.

7. The gaming system of claim 6, wherein the instructions, when executed, further cause the game controller to:

award the current progressive prize identified by the indicator in the prize ladder if a bonus game outcome is a winning outcome and the current progressive prize identified by the indicator is the largest progressive prize value at the top of the prize ladder;

indicate a subsequent progressive prize in the prize ladder to be subsequently competed for if the bonus game outcome is the winning outcome and the current progressive prize identified by the indicator is not the largest progressive prize value at the top of the prize ladder;

award the current progressive prize identified by the indicator in the prize ladder if the bonus game outcome is a losing outcome;

terminate the bonus game in response to the bonus game outcome being the losing outcome; and recommence the base game on the display if the bonus game has been terminated.

8. A method of displaying a wagering game on a gaming machine having a display device, a game controller, and a credit input operable to receive a physical item associated with a monetary value for establishing a credit balance, the credit balance being increasable and decreasable based at least on wagering activity, the method comprising:

sending data, by the game controller, to the display device indicative of a progressive prize randomly selected from a plurality of progressive prizes included in a prize ladder for animation on the display device in response to a winning game outcome in the wagering game based on a random number generated by a random number generator to provide a volatility;

forming, by the game controller, a) a first transformation path using a predefined set of prize modifiers being predetermined and each of the predefined set of prize modifiers, when selected, changes a resulting event in the winning game outcome being displayed on the display device, b) a second transformation path using one of the predefined set of prize modifiers in the first transformation path randomly determined by the random numbers, and c) a third transformation path using a unity transformation representing the progressive prize, while providing the volatility;

sending data for animation on the display device, by the game controller, indicative of the progressive prize being transformed based on one transformation path selected from the first transformation path formed, the second transformation path formed, and the third transformation path formed, into a modified progressive prize, while maintaining the volatility provided; and controlling, by the game controller, the display device to animate the modified progressive prize.

9. The method of claim 8, further comprising controlling, by the game controller, the display device to display the predefined set of prize modifiers selected during play of the wagering game.

10. The method of claim 8, further comprising controlling, by the game controller, the display device to display the predefined set of prize modifiers selected in association with a progressive prize value of the progressive prize selected.

11. The method of claim 8, wherein the wagering game is a bonus game, further comprising suspending, by the game controller, a base game when the bonus game commences.

12. The method of claim 11, further comprising controlling, by the game controller, the display device to display the prize ladder, the plurality of progressive prizes of the prize ladder arranged from a smallest progressive prize value at a bottom of the prize ladder to a largest progressive prize value at a top of the prize ladder.

13. The method of claim 12, further comprising controlling, by the game controller, the display device to display an indicator identifying one of the plurality of progressive prizes of the prize ladder as a current progressive prize.

14. The method of claim 13, comprising:

awarding, by the game controller, the current progressive prize identified by the indicator in the prize ladder if a bonus game outcome is a winning outcome and the current progressive prize identified by the indicator is the largest progressive prize value at the top of the prize ladder;

controlling, by the game controller, the display device to indicate a subsequent progressive prize in the prize ladder to be subsequently competed for if the bonus game outcome is the winning outcome and the current progressive prize identified by the indicator is not the largest progressive prize value at the top of the prize ladder;

awarding, by the game controller, the current progressive prize identified by the indicator in the prize ladder if the bonus game outcome is a losing outcome;

terminating, by the game controller, the bonus game in response to the bonus game outcome being the losing outcome; and recommencing, by the game controller, the base game when the bonus game has been terminated.

15. The method of claim 8, wherein the predefined set of prize modifiers comprises at least one of a multiplier, a bonus credit amount, a feature event, a mystery prize, and a combination thereof.

16. The method of claim 8, wherein the predefined set of prize modifiers comprises a predefined set of weighted prize modifiers, wherein higher weighted prize modifiers occur less frequently than lower weighted prize modifiers.

17. The method of claim 8, further comprising controlling, by the game controller, the display device to display a spinning wheel with a segment selector, wherein the spinning wheel comprises at least one segment, and wherein each segment comprises at least one prize modifier of the predefined set of prize modifiers.

18. The method of claim 17, wherein the at least one segment of the spinning wheel comprises a size that varies to reflect a probability associated with a selection of at least one prize modifier of the predefined set of prize modifiers, when the prize modifier is randomly selected.

19. The method of claim 8, further comprising controlling, by the game controller, the display device to display at least one prize modifier of the predefined set of prize modifiers, where more than one prize modifier is available to a player, and the one transformation path selected when the wagering game commences.

20. The gaming system of claim 1, wherein the display device is operable to present at least one prize modifier of the predefined set of prize modifiers and the one transformation path selected when the game commences.

* * * * *